Feb. 12, 1924.

E. KIEFER

AUTOMATIC CYLINDER RING

Filed May 19, 1922

1,483,352

Patented Feb. 12, 1924.

1,483,352

UNITED STATES PATENT OFFICE.

EDWARD KIEFER, OF FALLS CITY, NEBRASKA.

AUTOMATIC CYLINDER RING.

Application filed May 19, 1922. Serial No. 562,157.

*To all whom it may concern:*

Be it known that I, EDWARD KIEFER, a citizen of the United States, residing at Falls City, in the county of Richardson and State of Nebraska, have invented new and useful Improvements in Automatic Cylinder Rings, of which the following is a specification.

This invention relates to cylinder packing rings adapted for use in internal combustion or other engines.

An object of the present invention is the provision of a piston packing ring which co-operates with the piston to provide an expansion channel, whereby the bearing surface of the ring will be forced by expansion against the wall of the cylinder to prevent leakage of the gases, the ring further including a piston overlapping flange and an oil groove, whereby oil is directed against the cylinder wall to provide proper lubrication, yet prevent it from passing upward into the firing chamber.

With the above and other objects in view, the invention further includes the following novel features and details of construction, to be hereinafter more fully described, illustrated in the accompanying drawings and pointed out in the appended claims.

In the drawings:—

Figure 1:
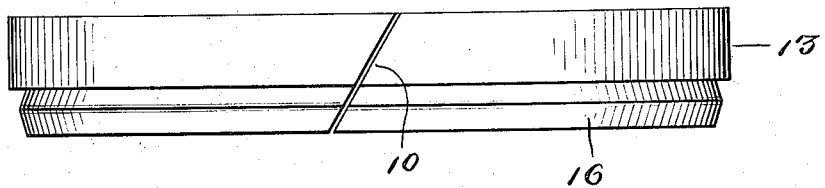
Figure 1 is an elevation of a piston packing ring constructed in accordance with the invention.
Figure 2:
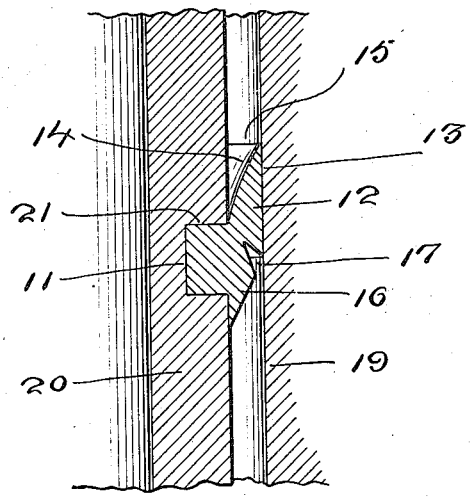
Figure 2 is an enlarged fragmentary sectional view illustrating the position of the ring with respect to the piston and engine cylinder.

Referring in detail to the drawings, wherein like characters of reference denote corresponding parts, the ring is shown as being transversely split as shown at 10, being transversely shaped to provide a substantially rectangular body portion 11 from which extends a substantially triangular flange 12. This flange extends around the circumference of the ring and includes a substantially flat bearing face 13 and an upper downwardly and inwardly inclined face 14, the latter co-operating with the adjacent outer wall of the piston to provide a substantially wedge-shaped expansion channel 15.

Extending downwardly from the lower end of the body portion of the ring is a circumferential flange 16 which overlaps the adjacent portion of the piston and whose outer periphery is within the plane of the bearing face 13 so as to be slightly spaced from the inner wall of the cylinder. Extending upwardly from the outer periphery of the flange 16 is an inwardly inclined wall which co-operates with the adjacent lower wall of the flange 12 to provide an oil groove 17.

In the drawings, a fragmentary portion of the cylinder is shown at 19, while a portion of the piston is shown at 20 and when the ring is in position, the body portion will be received within the usual ring groove 21. The face 13 of the flange 12 will work against the inner wall of the cylinder 19 and when an expansion occurs, the expanding gases will fill the expansion channel 15 and expand the ring so as to provide a leak proof joint between the bearing face 13 and the wall of the cylinder. On the downward stroke of the piston, oil from the walls of the cylinder will be gathered within the oil groove 17 and upon the return stroke will be fed to the cylinder wall so as to keep the same properly lubricated.

By the use of the rings above described, the cylinder of an engine may be kept in a perfectly round condition and if the rings are used within a cylinder which has been worn oval, the pressure of the rings will bear against that portion of the cylinder having the smallest diameter and will exert wear sufficiently to bring the cylinder into proper rounded shape.

The invention is susceptible of various changes in its form, proportions and minor details of construction and the right is herein reserved to make such changes as properly fall within the scope of the appended claims.

Having described the invention what is claimed is:—

1. A piston ring comprising a transversely split member of substantially rectangular cross sectional shape, a substantially triangular circumferential flange extending around the outside of said member and providing an outer flat bearing face and an inner and upper downwardly and inwardly inclined face spaced from the face of the piston and co-operating with the latter to provide a cross sectional wedge-shaped expansion channel and a lower inwardly and upwardly inclined face extending from the outer edge of the ring.

2. A piston ring comprising a transversely split member of substantially rectangular cross sectional shape, a substantially triangular circumferential flange extending around the outside of said member and providing an outer flat bearing face and an inner and upper downwardly and inwardly inclined face spaced from the face of the piston and co-operating with the latter to provide a cross sectional wedge-shaped expansion channel and a downwardly extending cross sectional wedge-shaped flange extending from the lower edge of the ring, the outer periphery of the flange being within the plane of the bearing face and an inclined wall connecting said outer periphery with the triangular flange, said wall being spaced from the lower inner wall of the said triangular flange and defining an oil groove.

In testimony whereof I affix my signature.

ED. KIEFER.